INVENTOR.
ALVIN A. SNAPER
BY
ATTORNEYS.

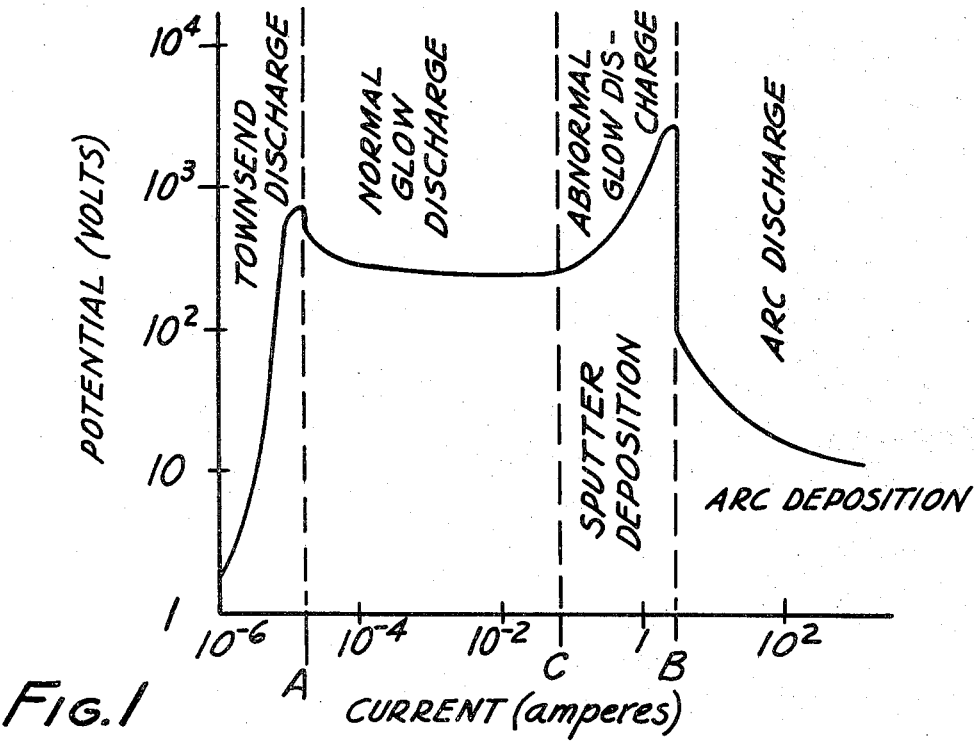
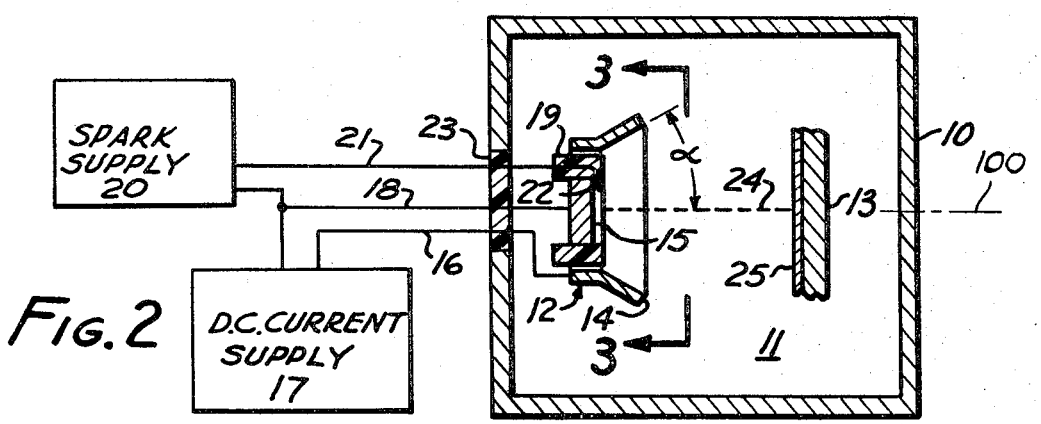
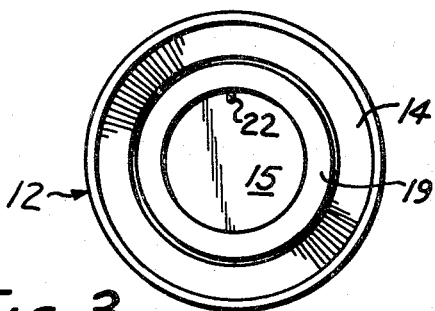

United States Patent Office 3,836,451
Patented Sept. 17, 1974

3,836,451
ARC DEPOSITION APPARATUS
Alvin A. Snaper, Chatsworth, Calif.
(2800 Cameo Circle, Las Vegas, Nev. 89107)
Original application Dec. 26, 1968, Ser. No. 787,029, now Patent No. 3,625,848. Divided and this application Oct. 21, 1970, Ser. No. 82,744
Int. Cl. C23c 15/00
U.S. Cl. 204—298                    18 Claims

ABSTRACT OF THE DISCLOSURE

A deposition process comprising emitting a beam of particles consisting of atoms and ions of source material, each particle having a kinetic energy between about 10 and 100 electron volts. The particles are deposited onto an object to coat the object with a thin film of source material. A beam gun is provided having an anode and a cathode and is supplied with current of such magnitude as to cause an arc discharge to occur between the anode and cathode to emit the beam.

CROSS-REFERENCE TO OTHER PATENT APPLICATION

This application is a division of application Ser. No. 787,029, filed Dec. 26, 1968, for "Arc Deposition Process and Apparatus," now U.S. Pat. No. 3,625,848.

This invention relates to deposition processes, and particularly to deposition of materials by means of arc discharge.

Thin film coatings are applied to base materials by either of two methods, namely by thermal deposition and by cathode sputtering deposition. In the thermal deposition process, a source material is heated in a vacuum to a vapor which in turn is condensed onto a surface of a substrate or base to form a thin film coating thereon. The thermal deposition method is useful for the manufacture of micro-electronic circuits, optical devices and coatings, and decorative and protective coatings. The deposition method is also used in the production of metal foils, as well as other uses.

Heretofore, thermal deposition processes have not been altogether successful. Certain alloys and mixtures, for example, cannot be vacuum deposited because one element of an alloy vaporizes at a different temperature than another element of such alloy thereby causing fractionization of the alloy due to the different time that the respective vapor temperatures are reached. Also, since the vaporized source material condenses on all surfaces within the vacuum chamber, a substantial portion of the source material is lost due to condensation on the walls of the vacuum chamber rather than on the substrate or base to be coated. Condensation of source material on the walls of the vacuum chamber causes a loss of source material and necessitates frequent cleaning of the vacuum chamber. Cryogenic "focusing" tubes having been used with thermal vacuum deposition processes to "focus" the source vapors, but such cryogenic tubes are costly and are not completely successful.

The cathode-sputtering deposition process has been utilized for generating a flux of atoms to be deposited wherein the atoms are ejected from a source material by bombarding the material with ions. The atoms emitted by the cathode-sputtering technique generally have more energy than the vapor particles of a vapor deposition technique, the most probable kinetic energy of the atoms of a cathode-sputtering technique being of the order of about 4 electron volts per particle as compared to about 0.1 electron volts for the average vapor particle. In the cathode-sputtering technique, alloys containing substances having different vapor points can be co-deposited on a substrate or base, and there is little likelihood of fractionization of the alloys and mixtures. However, the cathode-sputtering technique is relatively inefficient and slow (for example deposition rates may be as slow as less than 10 Angstroms per second), and is difficult to scale up for large industrial processes. Also, the cathode-sputtering technique usually requires a rarefied or inert atmosphere.

(A third method of deposition which is used on a somewhat smaller scale than the vacuum deposition and the cathode-sputtering deposition processes is the electrolysis deposition process, which like the cathode-sputtering deposition process is relatively inefficient, expensive and slow.)

It is an object of the present invention to provide a deposition process for depositing thin films of source material, which process produces beams of source material capable of being directed at a base or substrate structure to be coated.

Another object of the present invntion is to provide a deposition process for depositing source material utilizing an arc discharge.

Another object of the present invention is to provide apparatus capable of directing a beam of source atoms and/or ions at a base or substrate structure to be coated, the source atoms and ions having a higher kinetic energy than heretofore produced by cathode-sputtering techniques.

Another object of the present invention is to provide an arc discharge deposition process which is capable of producing thin films of uniform thickness, density and purity and having high strength and durability as compared to thin films produced by cathode-sputtering and vacuum deposition techniques.

In accordance with the present invention, a beam of atoms and ions of source material is emitted from a beam gun and directed at a base or substrate structure. The beam gun has a cathode and an anode arranged in such a manner as to cause an arc discharge between them. If a metallic source material is to be deposited, the cathode is constructed of the desired source material, and the arc causes emission of atoms and ions of source material. If the source material to be deposited is insulative, an insulative source material is positioned between the cathode and anode of the beam gun so that upon occurrence of the arc discharge, a beam of atoms of insulative source material is emitted.

According to an optional and desirable feature of the present invention a beam gun is provided capable of directing a beam of source atoms and ions at a base or substrate for depositing thin film coatings over such structure.

According to another optional and desirable feature of the present invention, automatic spark means is provided for initiating the arc discharge of the beam gun.

The above and other features of this invention will be more fully understood from the following detailed description, and accompanying drawings, in which:

FIG. 1 is a graph illustrating typical voltage-current characteristics for a discharge tube;

FIG. 2 is a side view elevation, in cutaway cross-section, of an arc deposition beam gun in accordance with the presently preferred embodiment of the present invention;

FIG. 3 is an end view elevation taken at line 3—3 in FIG. 2;

Figure 5:
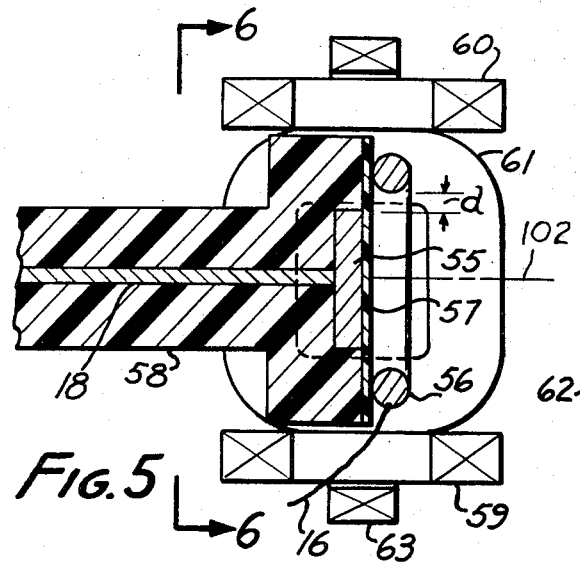
FIG. 5 is a side view elevation in cutaway cross-section of another modification of a beam gun in accordance with the present invention.

With reference to FIG. 1, the method in accordance with the present invention may be readily explained with relationship to other known techniques for depositing thin film materials onto a base structure. In FIG. 1 there is illustrated a typical voltage-current characteristic for a discharge tube. At relatively low currents, for example, less than about $10^{-5}$ amperes, a low current discharge can be maintained in a discharge tube if an external source of electrons or excitation is provided. This effect is often called the Townsend discharge or "dark" discharge. If the applied current exceeds a critical value, indicated at A in FIG. 1, or if the applied potential is raised to the break-down potential of the tube, then a self-sustaining discharge is initiated and current-conducting electrons and ions are generated by ionization of the low pressure gas within the tube. As the current is increased from point A (about $10^{-5}$ amperes) to point C (about 0.1 amperes), normal glow discharge continues on a self-sustaining basis and there is little change in voltage over the range of current. However, when the current is further increased above about 0.1 amperes, abnormal glow discharge occurs, and bombardment of gas ions on the cathode releases particles of source material from the cathode. It is in the region between points C and B in FIG. 1 that ordinary cathode-sputtering deposition takes place.

In the region between points C and B in FIG. 1, the particles released from the cathode have a kinetic energy averaging about 4 electron volts per particle. However, if the current is increased beyond point B on the graph in FIG. 1, for example, to about 200 amperes, an arc discharge occurs between the electrodes of the tube, which arc is generated by current passing through a small, rapidly moving spot on the cathode. Electrons are emitted from the cathode, and discharge is sustained without the necessity of a gas present in the tube. (In case the tube is highly evacuated, points A and B in FIG. 1 coincide, and the discharge is initiated at a predetermined current, below which "Townsend Discharge" occurs and above which arc discharge occurs. This phenomenon is often referred to as a "vacuum arc".)

In accordance with the present invention, a beam gun is provided which is capable of operating in a region above point B in FIG. 1 so that arc discharge occurs thereby emitting source atoms and ions which are capable of depositing onto a base structure. In the case of a metallic source material, the cathode is constructed of such source material and a rapidly moving spot on the cathode caused by high current and arc discharge generates a directed beam of high energy atoms and ions with kinetic energies in the range of about 10–100 electron volts. The high energy atoms and ions are capable of forming thin films and coatings on base or substrate structures, and the flux intensity of the beam is sufficient to provide deposition rates at an order of magnitude higher than that capable by sputter deposition methods. For example, with the present invention, the arc deposition process is capable of deposition rates of an order of more than 100 angstroms per second and, in some cases, as high as 1 micron per second or more.

In FIG. 2 there is illustrated apparatus for use in a basic arc deposition process. Housing 10 defines a chamber 11 containing beam gun 12 and body 13. Body 13 may be any suitable base upon which a thin film of source material is to be deposited. By way of example, body 13 may be an object upon which a protective coating is to be applied, or may be a substrate upon which thin film circuit devices are to be deposited. Beam gun 12 comprises a substantially frusto-conical anode 14 constructed of conductive material and a substantially cylindrical cathode 15 also constructed of conductive material. Anode 14 is connected by lead 16 to the positive side of DC supply 17, and cathode 15 is connected by lead 18 to the negative side of the DC supply. DC supply 17 may, for example, be a 30 volt DC source capable of supplying up to 200 amperes. The current supplied 17 is of such magnitude as to sustain an arc discharge, and ordinarily above about 2 amperes. Insulator 19 is positioned between anode 14 and cathode 15 so as to electrically insulate the anode from the cathode. By way of example, insulator 19 may be a suitable hard plastic or rubber material and may be substantially ring-shaped so as to encompass the periphery of cathode 15. Spark supply 20 is connected by means of lead 18 to cathode 15 and by means of lead 21 to electrode 22. As shown in the drawings, lead 21 preferably extends through insulator material 19 which supports electrode 22 in spaced relation to cathode 15. Leads 16 and 21 are passed through the wall of housing 10 and enter chamber 11 through seal 23.

In operation, spark supply 20 is initiated to place a relatively high positive voltage on electrode 22 thereby initiating an arc discharge to occur between cathode 15 and anode 14. The arc discharge is generated by current passing through a small, rapidly moving spot on the cathode to generate a beam of high energy atoms and ions of cathode source material to be directed toward object 13 along line 24 in FIG. 1. The width of the beam so generated may be determined upon the shape and size of anode 14, and the beam has a semi-angle $\alpha$ which may be determined by the frusto-conical shape of the anode. High energy atoms and ions of cathode material are emitted from the cathode. The kinetic energy of the atoms and ions released from the cathode range between about 10 to 100 electron volts per particle emitted, and the flux density of the beam is sufficient to provide deposition rates on an order and magnitude of greater than 100 Angstroms per second, and in some cases, as high as 1 micron per second or more. The atoms and ions are deposited onto substrate or base 13 in a uniform thickness, density and purity thereby forming thin film layer 25. Since the ions and atoms have a relatively high kinetic energy, the strength and durability of thin film 25 is substantially higher than that heretofore capable of being produced by a cathode-sputtering or vacuum deposition technique. It is believed that the relatively high energy of the particles causes atomic diffusion at the interface between the base and thin film thereby causing the higher bond strength.

The process may be carried out in any desirable atmosphere, for example a vacuum, an inert atmosphere or an atmosphere containing a small amount of reactive gas. For example, if it is desired to assure stoichiometric composition of certain deposited compounds, it may be desirable to deposit such compound in an atmosphere of reactive gas which reacts with the deposited material to insure proper composition. In any event, the pressure within the chamber during the deposition process should be such that the mean free path is substantially greater than the distance between cathode 15 and substrate 13. The distance of the mean free path can be approximated by the equation:

$$d = \frac{10^{-4}}{p}, \qquad (1)$$

where $d$ is the mean free path in feet and $p$ is the pressure in the chamber 11 in torr.

Figure 4:
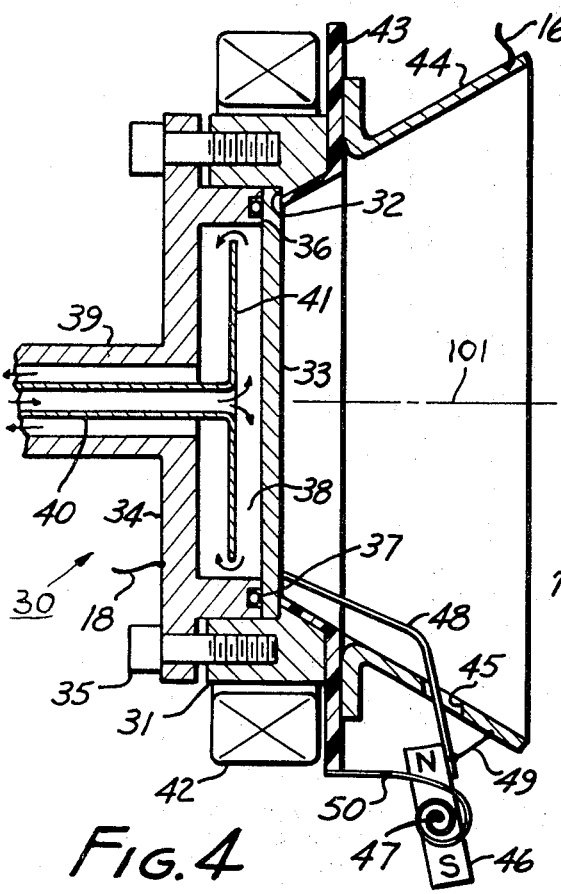
FIG. 4 is a side view elevation, in cutaway cross-section, of a modification of a beam gun in accordance with the present invention.

FIG. 4 illustrates a modification of the beam gun according to the present invention. Beam gun 30 comprises a housing 31 having an annular shoulder 32. Cathode disc 33, constructed of source material, is mounted in housing 31 in abutment with shoulder 32. Housing 34 is mounted to housing 31 by suitable threaded fasteners 35 so that face 36 abuts the opposite side of disc 33, thereby sandwiching cathode disc 33 between housings 31 and 34. O-ring seal 37 provides a fluid seal between the interface between disc 38 and housing 34 thereby enclosing manifold cavity 38 between them. Conduit 39 is connected to housing 34 and is in fluid communication with cavity 38. Tubular conduit 40 is disposed within conduit 39, and disc-shaped shield 41 is connected to the free end of conduit 40 so that the open end of conduit 40 is disposed on one side of shield 41 in cavity 38, while the open end of conduit 39 is on the other side of shield 41 in cavity 38.

Magnetic field coil 42 is disposed about the periphery of housing 31, and insulator 43 is mounted to housing 31 forwardly of disc 33. Frusto-conically shaped anode 44 is mounted to insulator 43 and includes slot 45 disposed in a portion thereof. Permanent magnet 46 is pivotally mounted to the beam gun by pivot 47 and carries electrode 48 which is connected by flexible wire 49 to anode 44. Coil spring 50 biases magnet 46 in a counter-clockwise direction, as illustrated in FIG. 4, so that electrode 48 is biased toward cathode 33. As in the case of the embodiment illustrated in FIGS. 2 and 3, lead 16 connects anode 44 to the positive side of a DC source (not shown) and lead 18 connects housing 34 (and cathode 23) to the negative side of the DC supply.

In operation of the beam gun illustrated in FIG. 4, magnetic field coil 42 is energized, thereby generating a magnetic field in the vicinity of permanent magnet 46. The magnetic field generated by coil 42 causes magnet 46 to rotate on pivot 47 so as to move electrode 48 away from cathode 33. The movement of electrode 48 from cathode 33 draws an arc from the cathode to initiate the arc beam. When the magnetic field coil is deenergized, the magnetic field is removed, and bias spring 50 urges magnet 46 back to the position illustrated in FIG. 4.

The magnetic field modifies the operating characteristics of the gun and the arc potential between the cathode and anode. Hence, the number of atoms and ions released from the cathode and the beam flux intensity are increased, thereby increasing the deposition rate of the beam gun. Furthermore, the magnetic field increases the directivity of the ionized beam generated by the beam gun.

To cool cathode 33, coolant, such as water, is admitted into manifold cavity 38 forwardly of shield 41 through center conduit 40. The coolant flows between the shield and cathode in the direction of the arrows and flows out of cavity 38 through conduit 39 at the rearward side of shield 41. Shield 41 thus assures proper flow of coolant to all portions of the cathode exposed to cavity 38 to assure proper dispersal of heat from the cathode.

Figure 6:
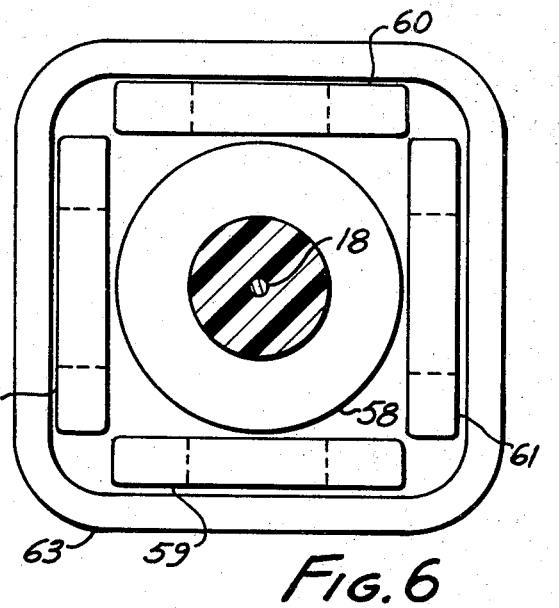
FIG. 6 is a section view taken along line 6—6 in FIG. 5.

Although the present invention has thus far been described in connection with the depositing of metallic source materials by utilizing an arc discharge and a consumable cathode, it is to be understood that the present invention may also be utilized for depositing insulative materials. An example of apparatus for depositing insulative materials is illustrated in FIGS. 5 and 6 wherein the beam gun is provided with a metallic cathode 55 connected by means of wire 18 to the negative side of a source of DC potential (not shown). Ring-shaped anode 56 is connected by means of lead 16 to the positive side of the source of DC potential, and a plate of insulative source material 57 is disposed between the cathode and anode. Plate 57 of insulative source material may cover one surface of the cathode, and the other surfaces of the cathode and lead wire 18 may be covered by insulative structure 58 having a thickness greater than the distance $d$ between cathode 55 and anode 56. Coils 59, 60, 61 and 62 are disposed about the periphery of the cathode/source material/anode sandwich and are driven by radio frequency current to generate a radio frequency radiation field. By way of example, the frequency imposed on coils 59–62 may be in the range between about 10 and 30 megacycles per second. Magnetic field coil 63 is disposed about the periphery of the radio frequency coils.

In operation of the beam gun illustrated in FIGS. 5 and 6, the beam gun is placed within a chamber which preferably contains an atmosphere of gas. The gas is preferably one which will sustain an arc discharge between the cathode and anode, and is slightly conductive. The maximum pressure of the gas, and/or the maximum distance between the cathode and the object to be coated is determined by Equation 1. Coils 59–63 are energized and a DC supply is connected to leads 16 and 18. An arc discharge occurs between cathode 55 and anode 56 through the insulative disc 57, thereby discharging atoms and ions of insulative material toward a substrate or base to be coated (not shown). The gas within the chamber containing the beam gun aids to initiate and maintain the arc discharge between the cathode and anode. The discharge is driven by the radio frequency field generated by coils 59–62, and the magnetic field generated by field coil 63 controls discharge characteristics and shapes the beam as heretofore described in connection with the beam gun illustrated in FIG. 4.

Figure 7:
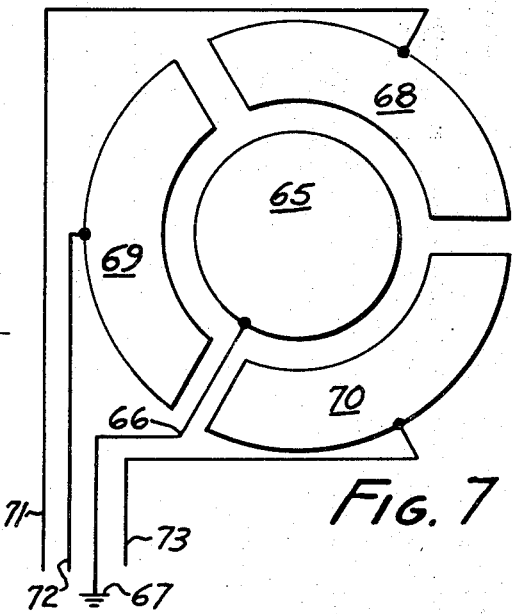
FIG. 7 is an end view elevation of another modification of a beam gun for use in an arc deposition process according to the present invention.

FIG. 7 is an end view elevation of another modification of a beam gun for use in an arc deposition process in accordance with the present invention. The beam gun illustrated in FIG. 7 is particularly useful for operation by three-phase AC power. Cathode 65 is connected by lead 66 to ground or common 67. Anode segments 68, 69 and 70 are connected by leads 71, 72 and 73 to respective phases of the three-phase power source (not shown). As illustrated in FIG. 7, the cathode section 65 is substantially circular in shape, and the three segments 68, 69 and 70 of the anode form a segmented ring about the cathode.

In operation of the beam gun illustrated in FIG. 7, since the alternating potential imposed on each anode is phase-shifted from the potential imposed on the other anodes, at least one of the anodes must be positive with respect to the cathode at any particular time. Arc discharge occurs between the cathode and the anode which is positive. The arc moves from anode to anode as the anodes successively become positive. Arc discharge is not likely between two anode segments, but should such arc occur, the arc would be extinguished within 7 milliseconds when the potential between the anodes decreases to below the minimum arc potential.

Figure 8:
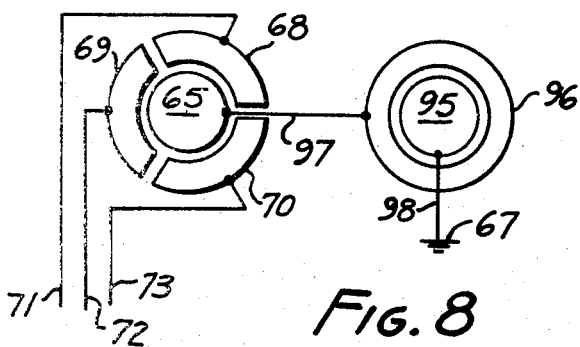
FIG. 8 is a plan view of another modification of a beam gun according to the present invention.

One feature of the three-phase beam gun resides in the fact that one segmented beam gun effectively rectifies the current of the three-phase system so that other beam guns may be connected in series therewith and need not be segmented. Such an arrangement is illustrated in FIG. 8 wherein a first beam gun having a cathode 65 and anode segments 68, 69 and 70 is connected in series with a second beam gun having a cathode 95 and a ring-shaped anode 96 disposed about the periphery thereof. Cathode 65 is connected by lead 97 to anode 96 and cathode 95 is connected by lead 98 to ground or common 67. Cathode 65 is always negative with respect to at least one anode 68–70 so that anode 96 is always positive with respect to cathode 95.

Figure 9:
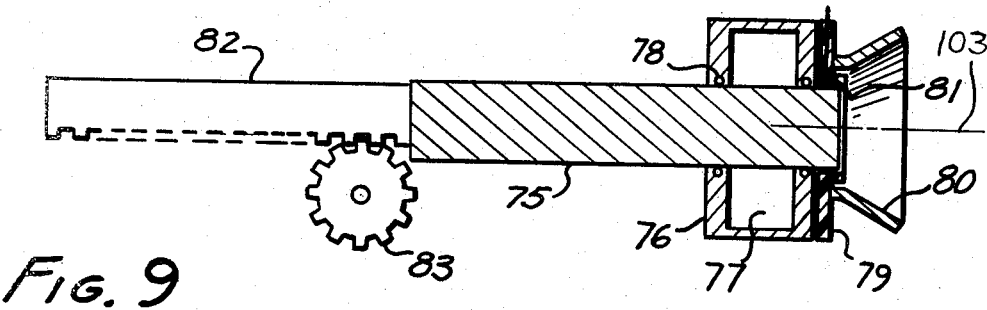
FIG. 9 is a side view elevation, in cutaway cross-section, of another modification of a beam gun for use in an arc deposition process in accordance with the present invention.

FIG. 9 illustrates a feed mechanism for a consumable cathode for a beam gun in accordance with the present invention wherein cathode 75 comprises an elongated rod mounted to housing 76 of the beam gun. Manifold cavity 77 is formed within housing 76 and around the periphery of the end of cathode rod 75, and O-ring seals 78 are provided between rod 75 and housing 76 to provide a fluid seal between them. Insulator 79 is positioned between cathode rod 75 and anode 80, and electrode 81 is provided for the purpose of initiating a spark as hereinbefore described in connection with FIGS. 2 and 3.

Rack gear 82 is positioned in abutment to the opposite end of rod 75 and engages pinion gear 83. Upon rotation of pinion gear 83, rack gear 82 drives cathode 75 forwardly (or to the right as illustrated in FIG. 9). By relating the rate of movement of gear 83 with the deposition rate of the beam gun, the cathode material may be continuously driven into such position that the cathode is continuously consumed by the beam gun. Coolant material, such as water, may be passed through cavity 77 thereby cooling the cathode and the gun.

Figure 10:
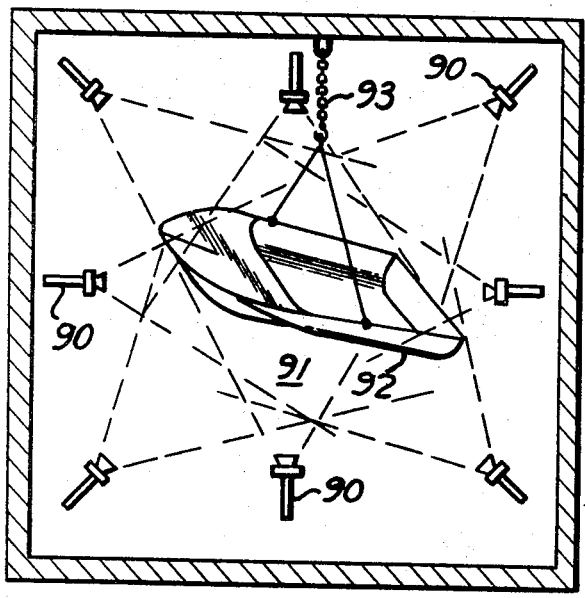
FIG. 10 is a side view illustrating an array of beam guns for applying a protective coating in accordance with the present invention.

FIG. 10 illustrates one application of the beam gun for applying a protective coating to an object. Beam guns 90 are positioned within chamber 91 and the object to be coated, such as vessel 92 is positioned within chamber 91 so that beam guns 90 may direct a thin film coating over object 92. By way of example, object 92 may be suspended within chamber 91 by means of chain 93.

The term "supply of source material" is used in this specification and in the claims to denote a body which is impinged upon by the arc to yield atoms and ions for deposition. In FIGS. 2, 4, 7, 8 and 9, the supply of source material is the surface of the cathode itself. In FIG. 5, the supply of source material is a plate disposed between the cathode and anode where it will be impinged upon by the arc for the same purpose.

Beam axis 100 is shown in FIG. 2, beam axis 101 in FIG. 4, beam axis 102 in FIG. 5, and beam axis 103 in FIG. 9. Similar axial orientations exist in FIGS. 7 and 8. The anode extends axially beyond the anode (it may or may not axially overlap). The anode may conveniently taper outwardly as it extends away from the cathode, and preferably has an open frustoconical end. The beam is generally directed along the beam axis, and the object to be coated is placed in its path. In the preferred embodiment, the cathode and anode (or anode segments) are concentric on the beam axis. Also in the preferred embodiment, the anode extends around the beam axis. This is the situation in all illustrated embodiments. Even though the anode may be segmented, its segments are grouped so as to extend around the beam axis as a group.

The present invention thus provides a deposition process capable of providing rapid deposition of thin film materials in uniform thicknesses with a relatively high bond strength of thin film material to base material. The process and its associated apparatus are efficient and practical, and provides an effective method of thin film coating for industrial purposes.

This invention is not to be limited by the embodiments shown in the drawings and described in description, which are given by way of example and not of limitation, but only in accordance with the scope of the appended claims.

What is claimed is:

1. Apparatus for depositing thin films of source material onto an object comprising: a housing defining an enclosed chamber, said chamber being adapted to receive an object to be coated; a beam gun in said chamber comprising structure adapted to be energized respectively to constitute a cathode and an anode mounted in spaced relation and so disposed and arranged as to emit a beam, means for supporting a supply of source material in said beam gun; and supply means for supplying current to said cathode and anode, the magnitude of said current obtainable from said supply means being sufficient to effectuate an arc discharge between said cathode and anode, whereby a beam of particles of source material can be emitted from said beam gun, each particle having a kinetic energy in the range of about 10–100 electron volts, the cathode and anode being so disposed and arranged that the arc discharge occurs between them, the supply of source material being so disposed and arranged as to be impinged upon by said arc.

2. Apparatus according to claim 1 further including spark initiation means mounted to said beam gun for initiating arc discharge between said cathode and said anode.

3. Apparatus according to claim 2 wherein said spark initiation means comprises an electrode mounted in spaced relation to the cathode and adapted to be connected to the positive side of a source of direct current.

4. Apparatus according to claim 3 wherein said electrode is connected to said anode and means mounting said electrode for adjustably positioning said electrode with respect to said cathode.

5. Apparatus according to claim 4 wherein said mounting means comprises a permanent magnet pivotally mounted to said beam gun, said electrode being supported by said magnet, and magnetic field generating means mounted to said beam gun for generating a magnetic field in the vicinity of said magnet, said magnetic field pivotally rotating said magnet to selectively position said electrode.

6. Apparatus according to claim 1 in which the cathode and anode are concentric on a beam axis.

7. Apparatus according to claim 6 in which the anode tapers away from the beam axis as it extends away from the cathode.

8. Apparatus according to claim 7 in which the anode is frustoconical.

9. Apparatus according to claim 6, in which the cathode is a plate, and the anode is a structure which extends around said beam axis.

10. Apparatus according to claim 6 in which the supply of source material is disposed on the beam axis and is disposed axially between the cathode and the anode.

11. Apparatus according to claim 6 in which magnetic field generating means is provided for generating a magnetic field for directing said beam of particles along said beam axis.

12. Apparatus according to claim 2 wherein said spark initiation means comprises field coil means adapted to generate a radio frequency field in said chamber.

13. Apparatus according to claim 1 wherein the surface of said cathode comprises said supply of source material.

14. Apparatus according to claim 13 wherein said cathode comprises a rod of source material, and drive means for driving said rod into said beam gun.

15. Apparatus according to claim 1 wherein said supply of source material comprises a plate positioned between said cathode and anode.

16. Apparatus according to claim 1 further including manifold means for supplying coolant to cool said cathode.

17. Apparatus according to claim 1 further including magnetic field generating means for generating a magnetic field for directing said beam of particles toward said object.

18. Apparatus according to claim 1 wherein said supply means supplies poly-phase current, said anode comprising a plurality of anode segments each connected to receive a separate phase of current, said cathode being connected to a common lead for each phase.

References Cited

UNITED STATES PATENTS

| | | | |
|---|---|---|---|
| 3,472,751 | 10/1969 | King | 250—49.5 |
| 3,325,392 | 6/1967 | Rommel | 204—192 |
| 2,909,697 | 10/1959 | Bernas et al. | 313—63 |
| 2,157,478 | 5/1939 | Burkhardt et al. | 204—192 |

JOHN H. MACK, Primary Examiner

W. A. LANGEL, Assistant Examiner